United States Patent
Pavlopoulou et al.

(10) Patent No.: US 8,972,425 B2
(45) Date of Patent: Mar. 3, 2015

(54) EFFICIENT GLOBALLY OPTIMAL INTERPRETATION OF DOCUMENTS

(71) Applicant: Palo Alto Research Center Incorporated, Palo Alto, CA (US)

(72) Inventors: Christina Pavlopoulou, Menlo Park, CA (US); Evgeniy Bart, Sunnyvale, CA (US); Eric Saund, San Carlos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 161 days.

(21) Appl. No.: 13/799,568

(22) Filed: Mar. 13, 2013

(65) Prior Publication Data
US 2014/0280078 A1 Sep. 18, 2014

(51) Int. Cl.
*G06F 17/30* (2006.01)

(52) U.S. Cl.
CPC .................... *G06F 17/3053* (2013.01)
USPC .......................................................... 707/755

(58) Field of Classification Search
CPC ...................... G06F 17/30864; G06F 17/30867
USPC .................................................. 707/723, 755
See application file for complete search history.

(56) References Cited

U.S. PATENT DOCUMENTS

| | | | |
|---|---|---|---|
| 8,625,886 B2 * | 1/2014 | Bart et al. .................... | 382/159 |
| 2013/0311490 A1 * | 11/2013 | Mansfield et al. ........... | 707/755 |

* cited by examiner

*Primary Examiner* — Rehana Perveen
*Assistant Examiner* — Hicham Skhoun
(74) *Attorney, Agent, or Firm* — Fay Sharpe LLP (57) ABSTRACT

A method is provided for parsing a document having a plurality of lines on which items are listed spanning one or more lines. It includes: obtaining a plurality of candidates, representing hypothetical items within the document, each candidate spanning one or more lines and having a local cost representing a confidence in a quality of the candidate compared to a model; determining labeling costs for intervals of the document defined between pairs of lines, each interval containing candidates therein, each labeling cost reflecting a configuration of the candidates within the interval; identifying a best labeling for each interval based on the labeling costs determined for that interval, the best labeling corresponding to one of the configurations of the candidates within the interval; defining a global objective function; and selecting a subset of the candidates such that the global objective function is optimized, based on the identified best labelings.

16 Claims, 9 Drawing Sheets

|   | 12 | 14 | 16 |
|---|----|----|----|
| 1 | 1987 | BASEBALL | $1.00 |
| 2 | 3704 | BAT | $6.00 |
| 3 | 7363 | T-SHIRT, RED | $5.00 |
| 4 |  | SIZE M |  |
| 5 | 8007 | HAT | $8.50 |
| 6 | 3909 | GOLF SHOES, | $2.57 |
| 7 |  | BRAND X |  |
| ⋮ | ⋮ | ⋮ | ⋮ |
| L | 1234 | FOOTBALL | $4.00 |

|   |      |              |        |
|---|------|--------------|--------|
| 1 | 1987 | BASEBALL     | $1.00  |
| 2 | 3704 | BAT          | $6.00  |
| 3 | 7363 | T-SHIRT, RED | $5.00  |
| 4 |      | SIZE M       |        |
| 5 | 8007 | HAT          | $8.50  |
| 6 | 3909 | GOLF SHOES,  | $2.57  |
| 7 |      | BRAND X      |        |
| ⋮ | ⋮    | ⋮            | ⋮      |
| L | 1234 | FOOTBALL     | $4.00  |

Rows 3–4 braced as $X_{s,k} = X_{3,4}$; rows 4–5 braced as $X_{s,k} = X_{4,5}$.

Rows 3–5 braced as INTERVAL $[i,j] = [3,5]$.

FIG. 4

| | | |
|---|---|---|
| 1 | 1987 | BASEBALL $1.00 |
| 2 | 3704 | BAT $6.00 |
| 3 | 7363 | T-SHIRT, RED $5.00 |
| 4 | | SIZE - M |
| 5 | 8007 | HAT $8.50 |
| 6 | 3909 | GOLF SHOES, $2.57 |
| 7 | | BRAND X |
| ⋮ | ⋮ | ⋮ |
| L | 1234 | FOOTBALL $4.00 |

Rows 3–4 braced as $X_{s,k} = X_{3,4}$; row 5 UNASSIGNED; $C(X_{3,4}, 3, 5)$

INTERVAL $[i, j] = [3, 5]$ spans rows 3–5.

FIG. 5

|   |   |   |
|---|---|---|
| 1 | 1987 | BASEBALL $1.00 |
| 2 | 3704 | BAT $6.00 |
| 3 | 7363 | T-SHIRT, RED $5.00 |
| 4 |  | SIZE M |
| 5 | 8007 | HAT $8.50 |
| 6 | 3909 | GOLF SHOES, $2.57 |
| 7 |  | BRAND X |
| ... | ... | ... |
| L | 1234 | FOOTBALL $4.00 |

INTERVAL [i, j] = [3, 5] (rows 3–5)

UNASSIGNED $X_{s,k} = X_{4,5}$ $C(X_{4,5}, 3, 5)$

EFFICIENT GLOBALLY OPTIMAL INTERPRETATION OF DOCUMENTS

BACKGROUND

The present inventive subject matter relates generally to the art of automated document processing. Particular but not exclusive relevance is found in connection with parsing and/or interpretation of documents, e.g., such as sales receipts, invoices, tables, lists, healthcare forms, etc. The present specification accordingly makes specific reference thereto at times. However, it is to be appreciated that aspects of the present inventive subject matter are also equally amenable to other like applications.

Documents often consist of multiple sub-structures, referred to herein as "items." For example, a book may consist of multiple paragraphs; an invoice may consist of a header, an itemized list of purchases, and a footer; a healthcare claims form may consist of a multitude of items specifying various information about the patient, insurance coverage, treatment, care provider, etc. Complete document interpretation generally involves finding all or subset of the items and assigning interpretations, or functional roles, to them. These roles supply meaning to the items and allow them to be used in higher-level processing, such as data mining. As an example, an item which contains the number "10.00" without a functional role is not particularly useful, except maybe for text search. The same item annotated or assigned with the role of "price" is much more useful and can be used, for example, for storing in or matching to a database, or for applying business rules to a purchase, etc.

Currently, many individuals and/or businesses may perform the aforementioned parsing and/or interpretation task manually. This can lead to significant costs of document processing. For example, it has been estimated that the cost of processing a single invoice is not insignificant. In some cases, large businesses may process tens of thousands of invoices per day, which can result in disadvantageously high operating costs. Accordingly, some may find it result in disadvantageously high operating costs. Accordingly, some may find it desirable to reduce the manual effort involved in parsing and/or interpreting documents.

Commonly, documents consist of many individual items. One notable hurdle in interpreting such documents is that these items are usually not independent. For example, in many documents no two items may occupy the same region; therefore, the end of one item may determine the beginning of another. Although this interaction may seem somewhat trivial at first, it can present a relatively daunting challenge when item boundaries are ambiguous and/or cannot be detected reliably. Other complex interactions between items may include alignment and common font, or consistent differences in font size used to indicate subordination relations between items. An example of an even more complex interaction is that in invoices, the prices of individual items generally have to sum up to the total amount due.

When interactions between items are present in a document, local decisions about the items can become brittle and unreliable, and it can be beneficial in this case to formulate a problem in terms of optimizing a global objective function. However, when a document interpretation problem is formulated in this manner, optimizing the objective globally by brute force can be infeasible and/or impractical for long documents with many items, and particularly for multi-page documents.

Previously, some approaches have been proposed to accomplish complete document interpretation, which involve detecting the individual items in a document one by one, independently from each other. In one example of such an approach, the items of interest in a document are extracted using tags. For example, the total amount due on an invoice may have the word "TOTAL" as a tag; locating the tag in a document provides a cue for the location of the item of interest. However, in this case, the items are matched independently from each other.

In other previous works, complete documents, as well as sub-structures of interest, are represented by graphs. These graphs encode relations such as adjacency, alignment, and reading order. Sub-graph matching is used to find items of interest. Again, these items are matched independently from each other. It is assumed that the conditions for matching are specified so that multiple hypotheses for each item do not have to be considered. As a result, it is often difficult and/or impractical to specify these conditions accurately enough automatically; accordingly, a significant amount of expert user input may be demanded.

A general criticism of "independent matching" approaches is that local matches can often be ambiguous. In such cases, determining the best overall interpretation of a document, and the globally optimal locations of each item, generally benefits from accounting for the interactions between items. Independent matching approaches tend to perform poorly in these circumstances.

In yet other prior work, an assumption of class-conditional independence has been used. In this work, each document is classified into one of several predefined styles. Within each style, items are assumed to be independent. One drawback of this approach is that mixed styles, and styles that cannot be decomposed into non-interacting items, are generally not allowed. Many real-life documents cannot therefore be interpreted. Another disadvantage is the styles and extraction procedures for each style have to be specified; accordingly, new or unexpected styles generally cannot be handled directly.

Another kind of general approach previously proposed involves segmenting the document into individual items first, and then determining the type (or functional role) of each segment. In accordance with such approaches, it is hoped that the segments indeed correspond to items in a one-to-one manner. In one example of a segmentation-based approach, tables are parsed using alignment and whitespace to detect the item boundaries. In other examples, bottom-up segmentation is first used to detect item boundaries; in some cases, the items are then assigned functional roles using constraint satisfaction. Segmentation is often done greedily for efficiency considerations, although finding a globally optimal segmentation is also possible.

One disadvantage of segmentation-based approaches is that segmentation errors are generally non-recoverable: if a given item is not represented by a single segment, correctly labeling that item becomes can be extremely difficult if not impossible. In contrast, the approach proposed herein avoids local segmentation decisions; as a result, it performs well even when segmentation is ambiguous locally. Some segmentation methods use backtracking to correct certain kinds of segmentation errors, but these decisions are made locally and independently without reference to any global objective function. As a result, in general, only a limited number of segmentation errors may be corrected. Another disadvantage of segmentation-based approaches is that in some documents, there is not enough information in the lay out to perform segmentation reliably. For example, in FIG. 1, there is no clear separation between individual line items (in particular, there are no rule lines, and line spacing between items is the same as line spacing between the text lines within each item).

Accordingly, a new and/or improved method and/or system or apparatus for parsing and/or interpreting documents is disclosed which addresses the above-referenced problem(s) and/or others.

INCORPORATION BY REFERENCE

U.S. patent application Ser. No. 13/022,877, filed Feb. 8, 2011, by Bart, et al. (hereinafter simply referred to as "Bart"); and U.S. patent application Ser. No. 13/799,289, filed Mar. 13, 2013, by Christina Pavlopoulou (hereinafter simply referred to as "Pavlopoulou") are both hereby incorporated herein by reference in their entirety.

SUMMARY

This summary is provided to introduce concepts related to the present inventive subject matter. The summary is not intended to identify essential features of the claimed subject matter nor is it intended for use in determining or limiting the scope of the claimed subject matter. The embodiments described below are not intended to be exhaustive or to limit the invention to the precise forms disclosed in the following detailed description. Rather, the embodiments are chosen and described so that others skilled in the art may appreciate and understand the principles and practices of the present inventive subject matter.

In accordance with one embodiment, a method is provided for parsing a document having a plurality of lines on which a series of actual items are listed, the listing of each actual item spanning one or more lines. The method includes: obtaining a plurality of candidates representing hypothetical items within the document, each candidate spanning one or more lines of the document and having a local cost associated therewith, the local cost representing a confidence in a quality of the candidate with respect to an item model; determining one or more labeling costs for one or more intervals of the document defined between given pairs of lines of the document, each interval containing one or more candidates therein, each labeling cost reflecting a different configuration of the candidates within the interval for which the labeling cost is determined; identifying a best labeling for each interval based on the one or more labeling costs determined for that interval, the best labeling corresponding to one of the different configurations of the candidates within the interval for which the best labeling is being identified; defining a global objective function; and selecting a subset of the candidates such that the global objective function is optimized, based on the identified best labelings.

In accordance with another embodiment, a system is provided for parsing a document having a plurality of lines on which a series of actual items are listed, the listing of each actual item spanning one or more lines. The system includes a data processor operative to execute the steps of the foregoing method.

Numerous advantages and benefits of the inventive subject matter disclosed herein will become apparent to those of ordinary skill in the art upon reading and understanding the present specification. It is to be understood, however, that the detailed description of the various embodiments and specific examples, while indicating preferred and other embodiments, are given by way of illustration and not limitation. Many changes and modifications within the scope of the present invention may be made without departing from the spirit thereof, and the invention includes all such modifications.

BRIEF DESCRIPTION OF THE DRAWING(S)

The following detailed description makes reference to the figures in the accompanying drawings. However, the inventive subject matter disclosed herein may take form in various components and arrangements of components, and in various steps and arrangements of steps. The drawings are only for purposes of illustrating exemplary and/or preferred embodiments and are not to be construed as limiting. Further, it is to be appreciated that the drawings may not be to scale.

DETAILED DESCRIPTION OF THE EMBODIMENT(S)

For clarity and simplicity, the present specification shall refer to structural and/or functional elements, relevant standards, algorithms and/or protocols, and other components, algorithms, methods and/or processes that are commonly known in the art without further detailed explanation as to their configuration or operation except to the extent they have been modified or altered in accordance with and/or to accommodate the preferred embodiment(s) presented herein. Moreover, the apparatuses and methods disclosed in the present specification are described in detail by way of examples and with reference to the figures. Unless otherwise specified, like numbers in the figures indicate references to the same, similar or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific materials, techniques, arrangements, etc. are either related to a specific example presented or are merely a general description of such a material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to the figures.

In this specification, there is described an efficient approach to interpreting long, multi-page and/or other documents, e.g., including a plurality of items. In the described approach, documents are segmented into multiple overlapping regions. Multiple local solution hypotheses for each region and for each item are entertained to avoid premature decisions. These local solution hypotheses are then combined efficiently into a globally optimal parse. One suitable embodiment uses dynamic programming for optimizing a global objective function. A key observation is that many documents may be arranged linearly, i.e., so that the underlying structure is one-dimensional. Dynamic programming is a powerful and efficient optimization algorithm that is applicable in these cases. However, alternative optimization methods are also contemplated.

One proposed framework includes three components or parts: (i) an objective function to be optimized, which relates to the final solution; (ii) a method for generating candidates and candidate annotations (functional roles) for each item or record; and (iii) a method for selecting a subset of candidates and annotations (referred to herein as the "final solution" or the "global solution") that maximizes the objective.

In general, there is disclosed herein an algorithm, method and/or system which is operative to optimally parse, interpret and/or otherwise process a document (e.g., such as a receipt, invoice, table, list, healthcare form etc.) into a sequence of items. Suitably, an efficient dynamic programming method is employed in executing the same. In practice, each item may correspond to a transaction record or the like. For example, in the case of receipts, such a record may include: an item number field, an item description field and an item price. Notably, the method scales well with respect to the length of the document and is suitable for multi-page documents.

For purposes of illustration herein, without limitation, the present specification shall focus on a task of parsing the line items of invoices, receipts, and similar documents. For this task, any information on the document (such as a header and/or footer) which is not part of a line item is ignored. The line items are assumed to follow the same known model. A model for a line item consists of a set of fields (e.g., such as an item number, a description, and a price) and their appearance and layout parameters, e.g., as described in Bart. The aim is to identify and extract all the line items from the document being processed, e.g., where extracting a line item includes identifying all of its fields. Suitably, the document to be parsed consists of well-defined text lines which are sorted from top to bottom. If the document spans multiple pages, the text lines are sorted as if the pages were concatenated vertically.

In practice, the aforementioned objective function is suitably dictated by the given application and the particulars of the task at hand. For example, the components included in the objective function may represent: an amount of text that is explained (i.e., assigned a known functional role); a confidence in the functional roles assigned to candidates; and consistency of various kinds among items (e.g., in an address, the zip code should be consistent with the city and state combination). In addition to a numerical score given by the objective function, hard constraints disallowing certain configurations may also be employed. In one suitable embodiment, an applied constraint is that no two items in the global solution should overlap. Note, however, that candidates are allowed to and often do overlap.

In one suitable embodiment, the objective function to be optimized takes into account the following information: (i) an amount of unexplained text; and (ii) the sum of local costs of all the candidates included in the global solution. More specifically, the amount of unexplained text left may be represented by a cost, denoted herein by $C_U(\bullet)$. For example, this may equal the number of text or document lines left unassigned, i.e., text or document lines whose text objects or tokens are not part of any item. This may be expressed as:

$$C_U(N_U) = N_u \quad (1)$$

where $N_u$ represents the number of text lines left unassigned. The sum of the local costs of all the candidates included in the global solution may be expressed as:

$$C_A(I_L) = \Sigma_{i_j \in I_L} C_A(X_{i_j}) \quad (2)$$

where $I_L$ is the set of indices of the candidates, and $X_{i_j}$ is a candidate with the index $i_j$. A more detailed description of the computation of these costs is described below. In general, the costs reflect the candidates' quality, with worse candidates having higher costs.

Using the foregoing notation, the goal for the final solution is to minimize the following criterion:

$$C(I_L, N_U) = C_A(I_L) + \alpha C_U(N_U) \quad (3).$$

As can be seen, this criterion balances the quality of individual candidates or items in the final solution with the amount of unexplained text leftover. For larger values of the weighting parameter $\alpha$, the algorithm will try to explain more text, at the expense of including poorer matches in the solution. For smaller values of $\alpha$, the algorithm will omit poorer items at the cost of leaving out more unexplained text. Suitably, one additional constraint on the solution is that the individual items in the global solution cannot overlap or intersect; i.e., each text object or token can belong to at most one item in the global solution. Notably, this objective function can be applied to multi-page documents in a straightforward manner.

In accordance with one suitable embodiment, a model of the items in a given document is assumed to be known or otherwise determinable, and a suitable method, algorithm and/or processes is employed to generate the candidates, e.g., as described in Bart or otherwise. In any event, the algorithm proposes or generates multiple overlapping hypotheses for the items, i.e., multiple overlapping candidates. Note, in this manner, premature local decisions can be avoided (e.g., such as segmentation decision) in cases where these local decisions are ambiguous. Instead, multiple candidates are generated, and the candidate which is best globally can be selected from among these for use in identifying the respective item in the final solution.

In practice, each generated candidate has a local cost (denoted by $C_A(\bullet)$ as previously mentioned) which reflects a confidence in the quality of the candidate. For example, this confidence is evaluated by using a probabilistic item model. Suitably, the model uses a variety of cues to determine confidence. In practice, these cues may be motivated by human perception and can include, without limitation, properties such as alignment, saliency, presence of gaps, and others, e.g., as described in Bart.

At this point, only local information has been taken into account. Accordingly, the globally optimal solution does not strictly include only those candidates with the lowest costs. For example, the global solution may be reached by selecting a candidate with a relatively higher local cost compared to another non-selected candidate, provided such a selection results in greater minimization of criterion (3) above, which may in fact be the case under some circumstances.

For multi-page documents, suitably, the same item model is applied to each page. Alternately, a different model may be applied to each page, for example, to take into account even and odd pages are formatted differently. In practice, this can be done either in a pre-determined fashion (i.e., by applying a pre-specified different model to each page), or adaptively (i.e., determining the most applicable model for the current page, or even modifying a pre-existing model to fit the current page).

Figure 1:
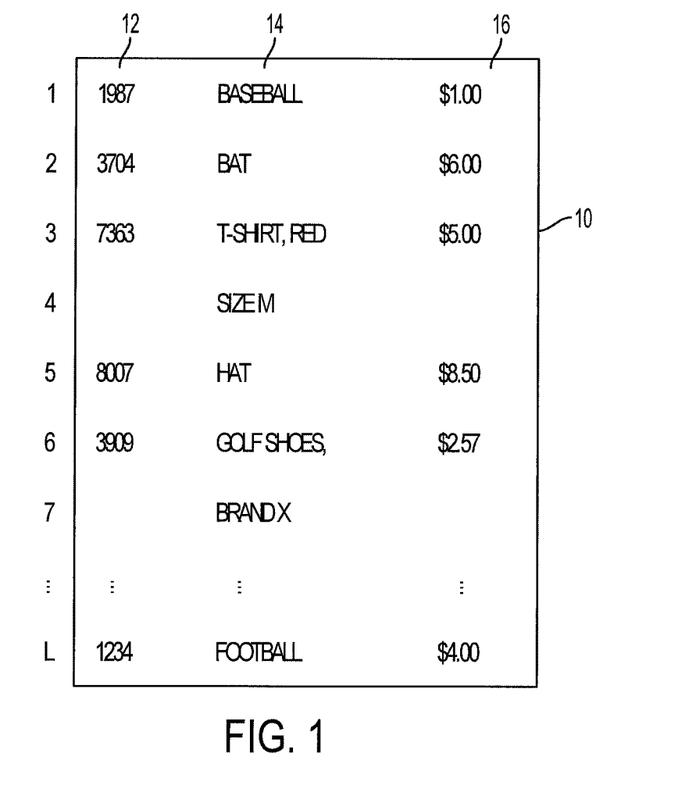
FIG. 1 is a diagrammatic illustration showing an exemplary semi-structured document suitable for processing in accordance with aspects of the present inventive subject matter.

FIG. 1 shows a document 10 suitable for parsing, interpreting and/or processing in accordance with the presently disclosed inventive subject matter. As in the illustrated example, the document 10 includes an array or sequential series of well-defined horizontal lines of text (i.e., text lines or document lines). In particular, for this example, the document 10 includes within the lines thereof a list of a number of items, e.g., as a sales receipt might. Each listed item has a corresponding product number 12, description 14 and price 16. Accordingly, an ideal or optimal parse of the document 10 places each individual item in a separate record or grouping, e.g., including in this case the item's number, description and price. For the sake of reference herein, the various lines of text of the document 10 have been consecutively numbered, i.e., 1 through L. It is to be appreciated however that in practice the actual document 10 may not include such numbering.

As can be appreciated and as illustrated in the present example, in some cases, the listing of and/or corresponding text for an item on the document 10 may span only one line of document, e.g., as is the case for the first, second and fourth items in this example (i.e., the baseball, bat and hat) spanning document lines 1, 2 and 5, respectively. In other cases, the listing of and/or corresponding text for an item on the document 10 may span multiple lines of the document, e.g., as is the case for the third and fifth items in this example (i.e., the t-shirt and golf shoes) spanning lines 3 and 4 and lines 6 and 7, respectively. Of course, in practice, the document may include other layouts and/or fields; the various different items included on the document may variably span any of one or more lines of the document; and the document may include multiple pages on which the items are listed.

Figure 2:
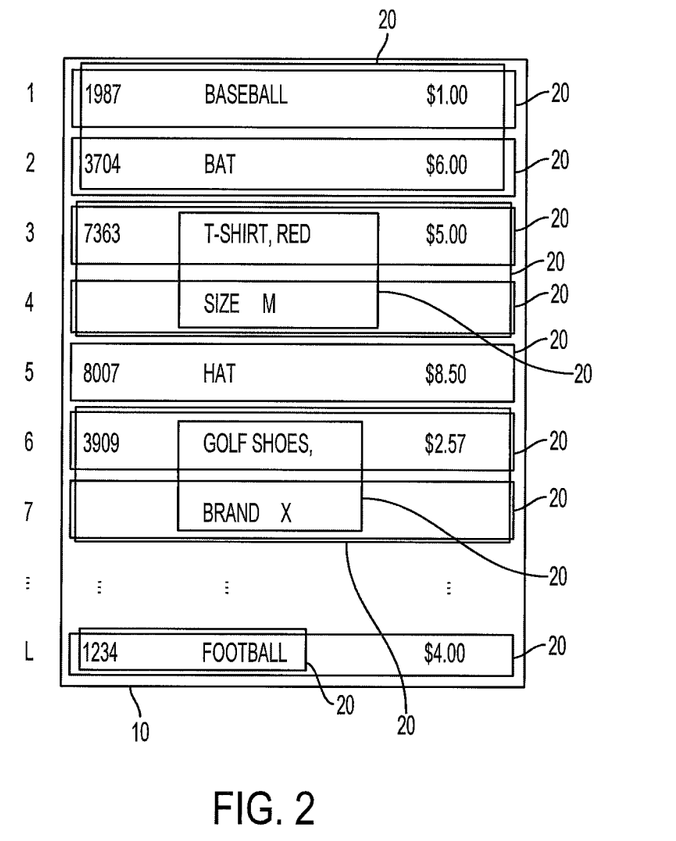
FIG. 2 is a diagrammatic illustration showing an exemplary set of candidates obtained for the document of FIG. 1 in accordance with aspect of the present inventive subject matter.

FIG. 2 shows a set of candidates 20 obtained for the document 10, where each candidate 20 represents a potential or hypothetical item in a final solution for the document 10. In practice, the candidates 20 may be determined, computed, identified and/or otherwise obtained, e.g., via a best-first leaf search (BFLS) and/or other algorithms as taught in Bart or via another suitable algorithm. In any event, as illustrated in the present example, each candidate 20 in the set thereof is identified by a box surrounding the respective tokens (i.e., in this case the various text) which are included in a given candidate 20. The total set of candidates 20 represents all or some filtered set of the hypothetical items which may be produced by a suitable parse of and/or final solution for the document 10. In practice, the final solution or optimal parse generally includes a selected subset of the candidates 20 which most closely reflects the actual items in the document 10.

Note, for the sake of simplicity and/or clarity herein, FIG. 2 shows a particular set of candidates 20 for the document 10. In practice however, it is to be appreciated that other candidates not shown may also be obtained and/or included in the set thereof. In any event, from the illustrated example, it can be seen that there exists some ambiguity regarding the specific item into which particular tokens and/or lines of text should be placed in accordance with a parse of the document 10. Notably, under an applicable constraint applied in accordance with aspects of the present subject matter, at most one candidate 20 is selected per row or line of the document 10. In other words, in the output parse or final solution which is deemed optimal in accordance with a suitable embodiment described herein, a given token or document line can belong to no more than one item at a time. However, commonly, an obtained set of candidates, e.g., such as the set of candidates 20 illustrated in FIG. 2, may have some tokens or document lines which belong to or are encompassed by multiple candidates. That is to say, as shown in FIG. 2, some of the candidates 20 overlap one another.

To illustrate further, consider the tokens/text on lines 4 and 7 of the document 10. The ambiguity to be resolved, as it were, involves selecting the appropriate parse which in fact correctly places the token/text with its corresponding item. For example, in one case or another, a hypothetical solution or parse may include a selected subset of candidates 20 in which the token/text on line 4 of the document 10 is: (i) included in an item with the tokens/text on line 3 of the document 10; (ii) included in a separate item of its own; or (iii) included in an item with the tokens/text on line 5 of the document 10. Similarly, for the token/text on line 7 of the document 10, a hypothetical solution or parse may include a selected subset of candidates 20 in which the token/text on line 7 of the document 10 is: (i) included in an item with the tokens/text on line 6 of the document 10; or (ii) included in a separate item of its own.

Of course, as the token/text on line 4 of the document 10 in fact is part of the preceding item (i.e., it is an extension of the item description 14 beginning on line 3 of the document 10) and the token/text on line 7 of the document 10 in fact is part its preceding item (i.e., it is an extension of the item description 14 beginning on line 6 of the document 10), the final solution and/or optimal parse of the document 10 is suitably the one that places the token/text on line 4 of the document 10 in the same item with the token/text on line 3 of the document 10; and places the token/text on line 7 of the document 10 in the same item with the token/text on line 6 of the document 10.

In accordance with one suitable embodiment, a method, algorithm and/or process (suitably executed by a processor or the like) may be employed to optimize the global objective function, i.e., to minimize criterion (3) above. Suitably, the input to this stage is a set of candidates along with their local costs. One or more of these candidates may span multiple text lines. Note again that many overlapping candidates may exist and that the candidates with the overall best local costs may not be a part of the optimal solution, strictly speaking. Suitably, the output of this stage includes a covering of the document with candidates, under the constraint that any text line contains at most one candidate. An example of the input and output of this stage can be seen in FIGS. 2 and 3, respectively. It is assumed that the document includes distinct text lines arranged from top to bottom, and multiple pages are simply concatenated, e.g., noting page breaks where appropriate.

In one suitable embodiment, the optimization of criterion (3) may be achieved in two steps (again, suitably executed by a processor or the like). In the first step, a best cost of labeling the text lines i through j with a single candidate is found. The candidates employed in this case are the ones generated as discussed above. In the second step, these costs are used to find the best "covering" of the document or page thereof.

As to the first step, it suffices to denote $X_{s,k}$ a candidate whose starting and ending text lines are s and k, respectively. For each pair of text lines i, j including item $X_{s,k}$, that is, i≤s and k≤j, a labeling cost $C(X_{s,k}, i,j)$ is computed as:

$$C(X_{s,j}, i,j) = C_A(X_{s,j}) + \alpha C_U(N_{i,j}^{s,k}) \quad (4)$$

where $N_{i,j}^{s,k}$ is the number of lines left unassigned in the interval [i,j].

Notably, the candidate generation process may produce multiple candidates X contained within the interval [i,j] of text lines. To find the best labeling cost within an interval [i,j], denoted herein as C*(i,j), the above expression (4) is suitably minimized over all such candidate items X. This can be expressed as:

$$C^*(i,j) = \min_{[s,k] \subseteq [i,j]} C(X_{s,k}, i, j) \quad (5)$$

Figure 4:
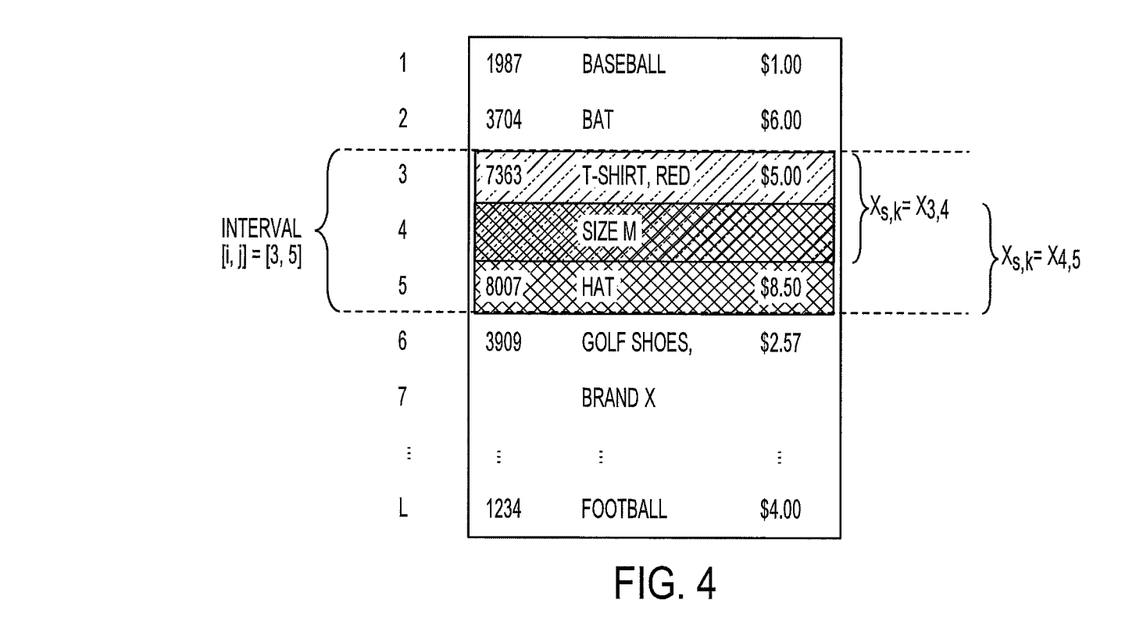
FIG. 4 is a diagrammatic illustration showing an interval of text lines within the document of FIG. 1 having overlapping candidates.
Figure 5:
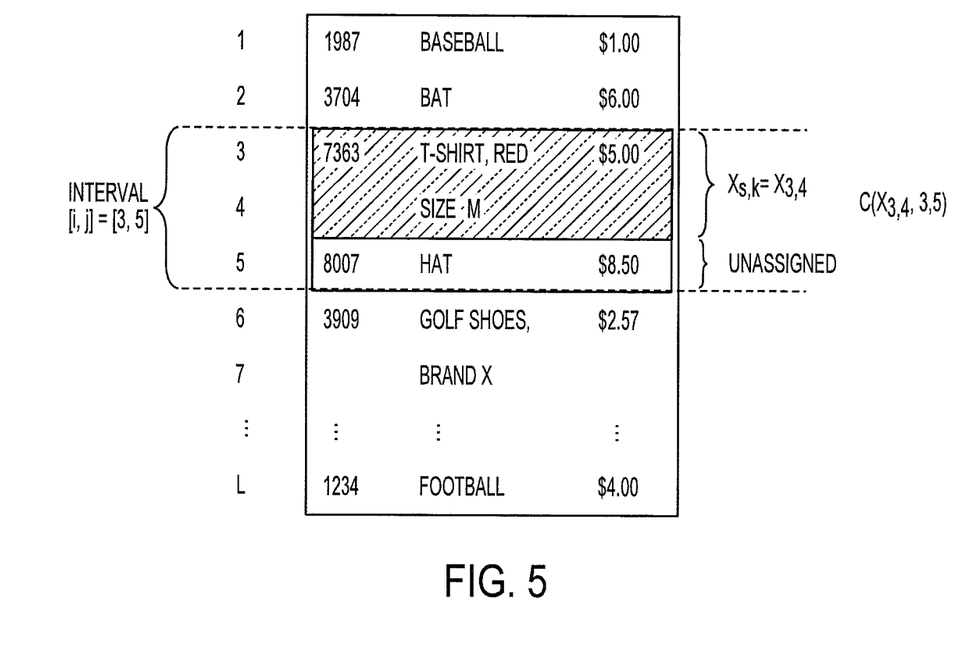
FIG. 5 is a diagrammatic illustration showing a first possible configuration of the example shown in FIG. 4 having a given labeling cost.
Figure 6:
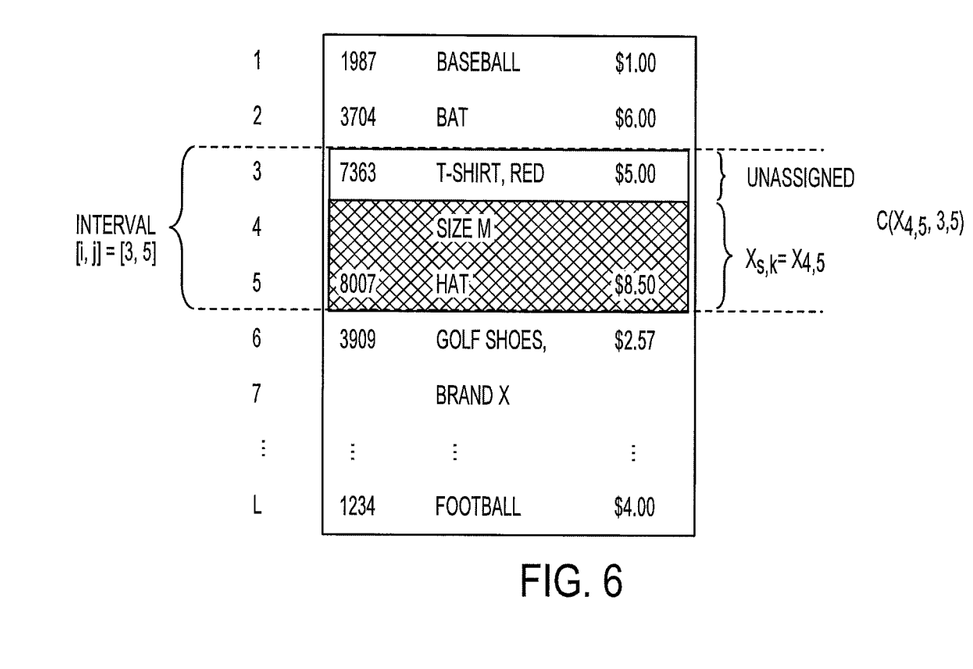
FIG. 6 is a diagrammatic illustration showing a second possible configuration of the example shown in FIG. 4 having a given labeling cost.

A simple example for this procedure is illustrated in FIGS. 4 through 6. Assume that the candidate generation process produces two line items $X_{3,4}$ and $X_{4,5}$ between an interval of lines 3 and 5 (e.g., as shown in FIG. 4). The best labeling cost for lines 3 through 5 is computed over the two configurations shown in FIGS. 5 and 6. Each of these configurations has one text line unassigned. Note that $X_{3,4}$ and $X_{4,5}$ will generally be considered when computing the best labeling cost for any interval [i,j] containing [3, 5].

Suitably, C*(i,j) can be efficiently computed by comparing the best labeling solution found for the text lines i through j−1 and the new configurations arising when considering candidate items in the interval [i,j]. Suitably, this can be expressed as follows (where α is the cost of leaving line j unassigned):

$$C^*(i, j) = \min\left\{C^*(i, j-1) + \alpha, \min_{s \geq i, k = j} C(X_{s,k}, i, j)\right\}. \quad (6)$$

In one embodiment, the second step of the optimization method includes optimizing the global criterion (3) given the locally optimal costs. Suitably, this is achieved with dynamic programming.

For example, in one suitable embodiment, define the quantity T(n, i) is defined as an optimal cost of selecting a number n of candidates 20 up to the i-th document or text line. In practice, T(n, i) may be computed recursively as:

$$T(n,i) = \min_{j \leq i} [T(n-1, j) + C^*(j, i)] \text{ for all } i \leq L \quad (7)$$

where L is the number of lines in the document 10. Accordingly, the total or global optimal cost for the document 10 is given by $\min_n T(n, L)$.

Figure 7:
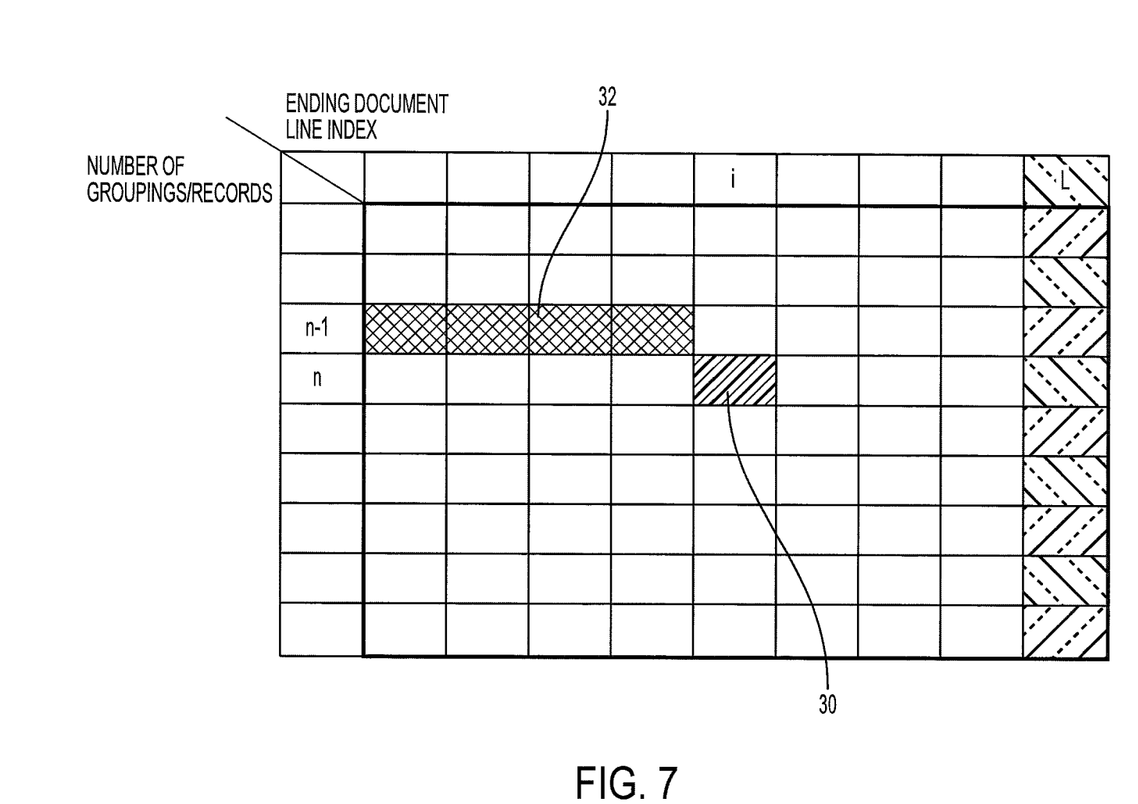
FIG. 7 illustrates an exemplary matrix suitable for use in executing an optimal parse of a semi-structured document in accordance with aspect of the present inventive subject matter.

In one exemplary embodiment, the optimization may be implemented and/or achieved with the aid of a matrix, e.g., such as the one shown in FIG. 7. In the illustrated matrix, each row corresponds to a particular index n which indicates the respective number of candidates that may be selected in a hypothetical parse, and each column corresponds to a particular index i which indicates the possible ending rows or document lines which are covered by the n selected candidates. Accordingly, each row n of the matrix contains the best costs of selecting n candidates (i.e., depending on the ending document line covered by the selected n candidates), and each column i of the matrix contains the best costs of labeling up to and including the document line i with one or more candidates (i.e., depending on the number n of candidates selected). In other words, a matrix entry (n, i) contains the cost of covering the document lines up to and including document line i with n candidates.

More specifically, the matrix is suitably established and/or generated by computing or otherwise determining and/or entering the respective values of T(n,i) in the corresponding matrix entries. Suitably, the matrix entries are filled in rowwise fashion. In practice, to compute or determine the cost or value for a matrix entry or element (n, i) (e.g., indicated by the crosshatched matrix entry 30), the algorithm or method computes or takes a minimum over those entries in the previous matrix row having an ending document line index less than i (e.g., those entries indicated by the hatched matrix entries 32). That is to say, a matrix entry (n, i) is suitably calculated or otherwise determined by taking the minimum cost or value of the matrix entries (n−1, j) for all j<i. Suitably, the last column (L) contains the best possible costs of covering the document 10 with n candidates. Hence, the global minimum is the minimum of the values or costs in the last column (L). Optionally, the index j of the text line that provides the optimal breakpoint in equation (7) is stored or saved or otherwise noted, e.g., as a pointer. Using these pointers, the optimal solution can be efficiently traced once the matrix is computed.

Figure 3:
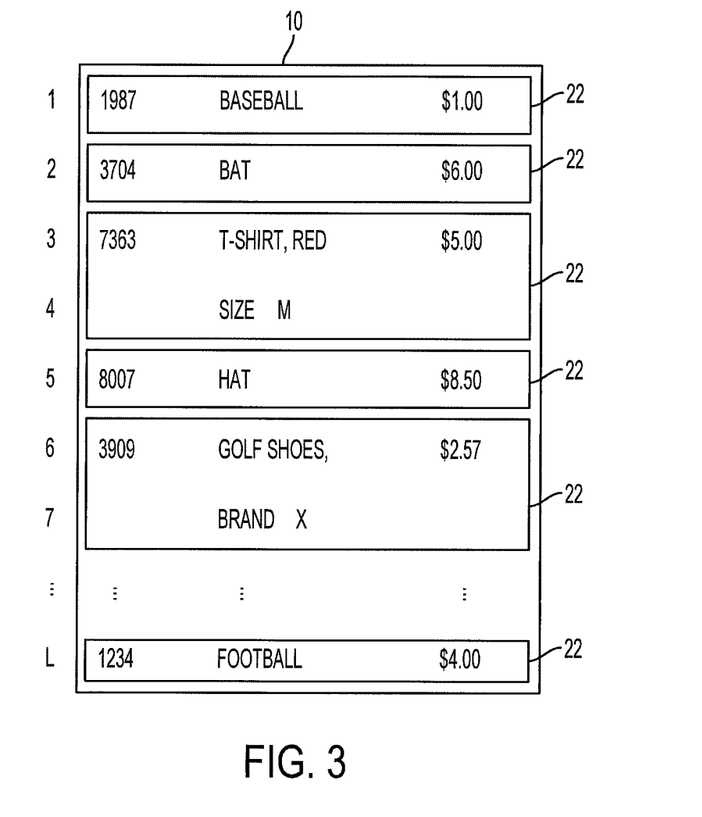
FIG. 3 is a diagrammatic illustration showing an exemplary final solution and/or optimal parse obtained for the document of FIG. 1 in accordance with aspect of the present inventive subject matter.

Returning attention now to FIG. 3, there is shown an exemplary output of the algorithm and/or document parsing method disclosed herein, i.e., a final solution and/or global optimal parse in accordance with aspect of the present inventive subject matter. In particular, the exemplary final solution or parse depicted in FIG. 3 is for the document 10 depicted in FIG. 1 having candidate records 20 obtained therefor, e.g., as shown in FIG. 2. More specifically, the boxes 22 in FIG. 3 denote a parse structure and/or a covering reflecting the selected subset of candidates 20 as determined by the algorithm and/or automatic parsing described herein. In practice, the covering or parse structure may be graphically depicted in, represented or otherwise superimposed over the document 10 or an image or replication of the document 10, e.g., either in hardcopy or electronic or some other representative format. Note that the illustrated representation of the parse and/or resulting covering is used here for readability. In other cases, the covering and/or parse structure may be represented and/or used in any of one or more ways depending on a specific embodiment or desired application, e.g., in one or more electronic data formats suitable for storing in a file or a database, exchanging over a network, and the like. Suitably, the text/tokens or other information or data included in the given item 22 may be extracted and/or provided with a meaningful label or semantic role or some other indicator or tag identifying the same, e.g., for use and/or storage in a database or spreadsheet or the like.

Figure 8:
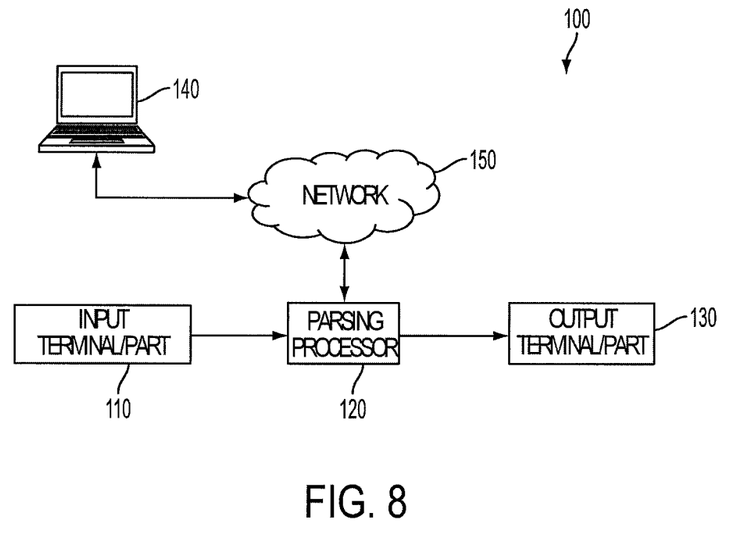
FIG. 8 is a diagrammatic illustration showing an exemplary apparatus and/or system suitable for practicing aspects of the present inventive subject matter.

With reference now to FIG. 8, there is shown a diagrammatic illustration of an exemplary apparatus and/or system 100 for parsing an input semi-structured document (e.g., such as the one shown in FIG. 1). As shown, the system 100 includes an input terminal and/or part 110 which captures, reads, receives and/or otherwise obtains the input document. For example, the input terminal or part 110 may include a scanner or the like which receives, reads and/or otherwise obtains an image of the document. Note that this input terminal may not be dedicated to the parsing system; rather, it may be a part of a larger document processing system and may share data with the parsing subsystem as well as with other systems.

The input terminal and/or part 110 in turn provides the image or other suitable representation of the semi-structured document to a parsing part and/or processor 120 that parses the input document. The resulting parse and/or other output from the parsing part and/or processor 120 is then provided, e.g., to an output terminal and/or part 130. Optionally, the output terminal and/or part 130 may include a display or monitor or printer or memory or data storage device or other like output device on which the resulting parse, parse structure and/or covering is selectively output and/or saved, e.g., either graphically or via some other suitable representation, be it electronic or otherwise. Suitably, the resulting output and/or parse (optionally, along with the document and/or contents thereof) may simply be saved using a suitable format in a data file or the like on a volatile or non-volatile memory or in another suitable data storage device (e.g., which uses electronic, magnetic, optical or other like data storage media). Optionally, the output may also be shown in human-readable format, such as using boxes or other graphical representation overlaid on the document image or other representation to denote the selected records and/or resulting parsed (e.g., as shown in FIG. 3).

In practice, the input document and/or image or other representation thereof may be received in the form of a data file or the like. Suitably, the received file may be received in and/or converted to one or more various formats, e.g., such as Tagged Image File Format (TIFF), Graphics Interchange Format (GIF) or other bitmap image format, Joint Photographic Experts Group (JPEG) format, Portable Document Format (PDF) or another suitable format for providing semi-structured document and/or its image. Optionally, the input file or data may be received by the parsing part and/or processor 120 from a computer, work station or other user terminal 140, e.g., over a suitable communications network 150. In turn, the parse and/or other output from the parsing part and/or processor 120 may be returned thereto, e.g., also via the network 150.

Figure 9:
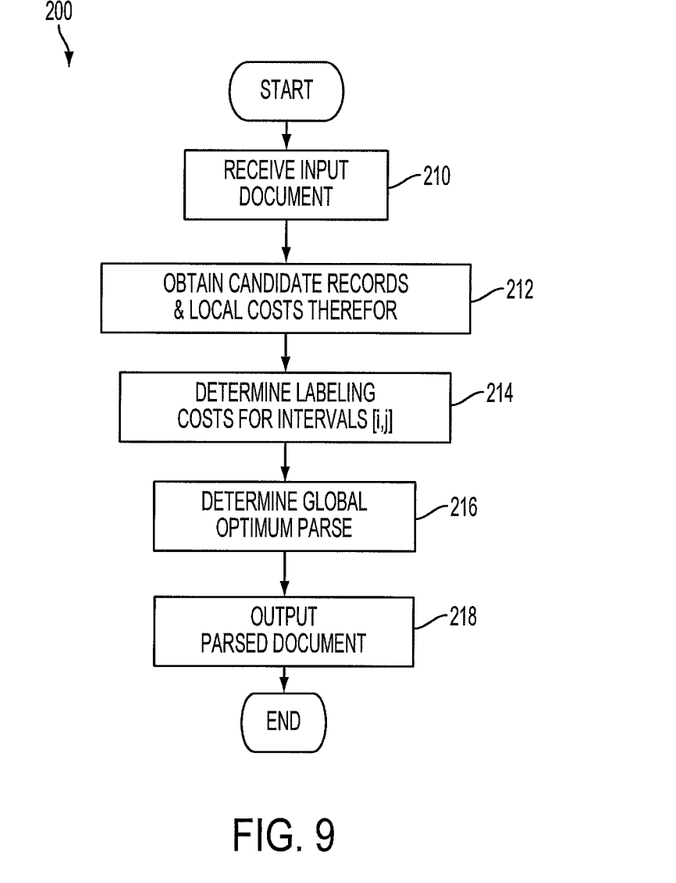
FIG. 9 is a flow chart showing an exemplary method and/or process for optimal parsing of a document in accordance with aspects of the present inventive subject matter.

With reference now to FIG. 9, there is shown an exemplary method or process 200, e.g., carried out by the processor 120 of the system 100, by which an input semi-structured document is parsed.

As shown, at step 210 an input document is received, e.g., from the input terminal or part 110 or from the user terminal 140 via the network 150.

At steps 212, a set of candidates 20 are identified and/or determined for the input document 10 along with their local costs, e.g., as taught by Bart. Optionally, this step may be carried out by the processor 120 or by a separate processor.

At step 214, the best labeling costs for each interval [i,j] of document text lines are computed or otherwise determined, e.g., as described above.

At step 216, the set of candidates 20 and the best labeling costs for the various intervals of document text lines are employed to derive, compute and/or otherwise determine the optimal parse or final solution for the document 10, e.g., via dynamic programming and/or as otherwise described above. For example, suitable, the processor 120 recursively computes and/or otherwise determines $T(n,i)$ as described above and/or determines the optimal global cost as $\min_n T(n,L)$. Suitably, to aid in the foregoing, the processor 120 may establish and/or generate the matrix shown in FIG. 7 and fill the same as described. Efficient tracing of the optimal solution upon termination of the procedure may be aided by optionally storing, for every $T(n,i)$ computed and/or determined, a pointer to the document line j where the previous candidate ends.

Finally, at step 218, the resulting parse is output. For example, the output may include a covering of the selected candidates over the document. In practice, the covering or parse structure may be graphically depicted in, represented or otherwise superimposed over the document 10 or an image or replication of the document 10, e.g., either in hardcopy or electronic or some other representative format. In other cases, the covering and/or parse structure may be represented and/or used in any of one or more ways depending on a specific embodiment or desired application, e.g., in one or more electronic data formats suitable for storing in a file or a database, exchanging over a network, and the like. Suitably, the text/tokens or other information or data included in the given items 22 may be extracted and/or provided with a meaningful label or semantic role or some other indicator or tag identifying the same, e.g., for use and/or storage in a database or spreadsheet or the like. Optionally, the output may also be shown in human-readable format, such as using boxes or other graphical representation overlaid on the document image or other representation to denote the selected candidates and/or resulting parsed (e.g., as shown in FIG. 3).

The above methods and/or apparatus have been described with respect to particular embodiments. It is to be appreciated, however, that certain modifications and/or alteration are also contemplated. For example, a variety of different applications and/or tasks can be solved using the described framework, including, without limitation: the parsing of simple tables, parsing health care forms, and others. Moreover, in the currently described task, all the candidates and/or items are of the same type, namely, a line item. However, tasks in which several different item types are present (e.g., addresses, names, phone numbers, etc.) are also contemplated, including tasks in which all the items are of different types.

In alternate embodiment, the objective function can be modified in numerous ways as appropriate for the target application. For example, the objective in equation (3) can be modified to make C smaller, so that unexplained text does not dominate the objective. In this case, unexplained text can be traded off for better local scores. Incorporating additional components in the objective is also possible. One consideration is the tradeoff between how well the objective function expresses the domain knowledge and how easy and efficient it is to optimize. If dynamic programming is used, suitably the objective function exhibits significant substructure. Note, however, that alternatives to dynamic programming are possible that relax this constraint.

A wide variety of modifications to the generation of candidates are also possible. Since eventually a global objective function is used, the algorithm for generating candidates (and their local scores, if appropriate) does not have to be very accurate or robust, strictly speaking. Often, it is acceptable to generate excess candidates to ensure that a correct candidate is not missed.

One exemplary modification includes generating candidates as described in Bart, but using ad hoc local scores rather than those computed in Bart. These local scores were based on similar information as in Bart, but were hand-tuned and did not employ training. In another alternative embodiment, e.g., useful for parsing health care claims forms and the like, candidates can be generated based on their position with respect to a known fixed template, with manually tuned local scores. For parsing simple tables and the line, candidates can be generated by splitting the table region along continuous whitespace regions.

One particularly useful modification may include generating candidates that span across page breaks and/or any header/footer material, to enable finding items that are broken across a page boundary.

For some global optimization algorithms, it is also contemplated to make candidate item generation more efficient by not generating any candidates which cannot possibly be contained in an optimal solution. As an example, in one suitable embodiment using dynamic programming, a candidate which does not maximize any $C(X,i,j)$ as per equation (5) will never participate in an optimal global solution, accordingly its generation can be omitted.

Several modifications of the dynamic programming algorithm are also contemplated. For example, in accordance with one described embodiment herein, the method extracts non-overlapping items. This constraint can optionally be easily relaxed without compromising the optimality, although it may tend to increase the computational cost. Similarly, the method can be easily extended to the case where each candidate may be assigned multiple functional roles. In addition, there are many general-purpose optimization algorithms that could be used instead of dynamic programming. Examples of such algorithms include, without limitation, A*, BFLS and described in Bart, and linear programming.

Notably, in various embodiments, the methods and/or system or apparatus disclosed herein has the ability to solve a wider range of problems than previously possible. Suitably, a single system can appropriately parse a broad range of documents from several different categories (such as invoices, receipts, etc.). Previously, e.g., separate systems were typically used and/or specifically tuned for each different task or category. The methods and/or inventive subject matter described herein define and optimize a global objective function in a manner efficient enough to scale, e.g., to long and especially multi-page documents. This is in contrast to previous methods, which either used a series of ad hoc local decisions without any global criterion, or used a global criterion that was too inefficient to be optimized exactly. The use of the global objective function herein aids in the solving of tasks more accurately than might be possible with ad hoc methods.

In any event, it is to be appreciated that in connection with the particular exemplary embodiment(s) presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that any one or more of the particular tasks, steps, processes, methods, functions, elements and/or components described herein may suitably be implemented via hardware, software, firmware or a combination thereof. In particular, the parsing processor 120 may be embodied by a computer or other electronic data processing device that is configured and/or otherwise provisioned to perform one or more of the tasks, steps, processes, methods and/or functions described herein. For example, a computer or other electronic data processing device embodying the parsing processor 120 may be provided, supplied and/or programmed with a suitable listing of code (e.g., such as source code, interpretive code, object code, directly executable code, and so forth) or other like instructions or software or firmware, such that when run and/or executed by the computer or other electronic data processing device one or more of the tasks, steps, processes, methods and/or functions described herein are completed or otherwise performed. Suitably, the listing of code or other like instructions or software or firmware is implemented as and/or recorded, stored, contained or included in and/or on a non-transitory computer and/or machine readable storage medium or media so as to be providable to and/or executable by the computer or other electronic data processing device. For example, suitable storage mediums and/or media can include but are not limited to: floppy disks, flexible disks, hard disks, magnetic tape, or any other magnetic storage medium or media, CD-ROM, DVD, optical disks, or any other optical medium or media, a RAM, a ROM, a PROM, an EPROM, a FLASH-EPROM, or other memory or chip or cartridge, or any other tangible medium or media from which a computer or machine or electronic data processing device can read and use. In essence, as used herein, non-transitory computer-readable and/or machine-readable mediums and/or media comprise all computer-readable and/or machine-readable mediums and/or media except for a transitory, propagating signal.

Optionally, any one or more of the particular tasks, steps, processes, methods, functions, elements and/or components described herein may be implemented on and/or embodiment in one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the respective tasks, steps, processes, methods and/or functions described herein can be used.

Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method for parsing a document having a plurality of lines on which a series of actual items are listed, the listing of each actual item spanning one or more lines, said method comprising:

obtaining a plurality of candidates representing hypothetical items within the document, each candidate spanning one or more lines of the document and having a local cost associate therewith, said local cost representing a confidence in a quality of the candidate with respect to an item model;

determining a plurality of labeling costs for one or more intervals of the document defined between given pairs of lines of the document, each interval containing a plurality of candidates therein, each said labeling cost reflecting a different configuration of the candidates within the interval for which the labeling cost is determined;

identifying a best labeling for each interval based on a plurality of labeling costs determined for that interval, said best labeling corresponding to one of the different configurations of the candidates within the interval for which the best labeling is being identified; defining a global objective function; and selecting a subset of the candidates such that the global objective function is optimize, based on the identified best labeling.

2. The method of claim 1, said method further comprising: constraining the selection of the subset such that no two selected candidates in the subset spans the same line of the document.

3. The method of claim 2, wherein at least two of the candidates overlap one another.

4. The method of claim 3, said determining further comprising:
computing a labeling cost, associated with each given candidate within the interval for which the given labeling costs are being determined, from the local cost of each given candidate and a value representing a number of lines, within the interval for which the given labeling costs are being determined, that are not spanned by the given candidate.

5. The method of claim 4, said computing further comprising: weighting the value with a weighting parameter; and
adding the weighted value to the local cost of the given candidate for which the labeling cost is being computed.

6. The method of claim 5, said identifying further comprising:
finding a minimum labeling cost of the computed labeling costs over the candidates contained within the interval, said minimum labeling cost corresponding to the identified best labeling.

7. The method of claim 6, further comprising:
defining a quantity $T(n,i)$ as an optimal cost of selecting a number n of candidates up to a line i; and
recursively computing $T(n,i)$ as $$T(n,i)=\min j(T(n-1)+C^*(j,i)) \text{ for all } i<=L$$

where L is a total number of lines in the document and $C^*(j,i)$ is the identified best labeling for the interval defined by the pair of lines j and i.

8. The method of claim 7, wherein a global optimal cost is given by min $T(n,L)$.

9. A system for parsing a document having a plurality of lines on which a series of actual items are listed, the listing of each actual item spanning one or more lines, said system comprising: a processor operative to:
obtain a plurality of candidates representing hypothetical items within the document, each candidate spanning one or more lines of the document and having a local cost associate therewith, said local cost representing a confidence in a quality of the candidate with respect to an item model;
determine a plurality of labeling costs for one or more intervals of the document defined between given pairs of lines of the document, each interval containing a plurality of candidates therein, each said labeling cost reflecting a different configuration of the candidates within the interval for which the labeling cost is determined;
identify a best labeling for each interval based on a plurality of labeling costs determined for that interval, said best labeling corresponding to one of the different configurations of the candidates within the interval for which the best labeling is being identified; define a global objective function; and select a subset of the candidates such that the global objective function is optimize, based on the identified best labeling.

10. The system of claim 9, said processor further operative to: constrain the selection of the subset such that no two selected candidates in the subset spans the same line of the document.

11. The system of claim 10, wherein at least two of the candidates overlap one another.

12. The system of claim 11, said processor further operative to: compute a labeling cost, associated with each given candidate within the interval for which the given labeling costs are being determined, from the local cost of each given candidate and a value representing a number of lines, within the interval for which the given labeling costs are being determined, that are not spanned by the given candidate.

13. The system of claim 12, said processor further operative to: weight the value with a weighting parameter; and add the weighted value to the local cost of the given candidate for which the labeling cost is being computed.

14. The system of claim 13, said processor further operative to: find a minimum labeling cost of the computed labeling costs over the candidates contained within the interval, said minimum labeling cost corresponding to the identified best labeling.

15. The system of claim 14, said processor further operative to: defining a quantity $T(n,i)$ as an optimal cost of selecting a number n of candidates up to a line i; and recursively compute $T(n,i)$ as $T(n,i)=\min\_i(T(n-1,j)+C^*(j,i))$ for all i L where L is a total number of lines in the document and $C^*(j,i)$ is the identified best labeling for the interval defined by the pair of lines j and i.

16. The system of claim 15, wherein a global optimal cost is given by min $T(n,L)$.

* * * * *